United States Patent [19]

Priester et al.

[11] Patent Number: 4,655,970
[45] Date of Patent: * Apr. 7, 1987

[54] PROCESS FOR THE MANUFACTURE OF ANTHRAQUINONE COMPOUNDS

[75] Inventors: Martin Priester, Dornach; Peter Loew, Münchenstein, both of Switzerland

[73] Assignee: Ciba-Geigy AG, Basel, Switzerland

[*] Notice: The portion of the term of this patent subsequent to Jul. 12, 2000 has been disclaimed.

[21] Appl. No.: 652,422

[22] Filed: Sep. 19, 1984

Related U.S. Application Data

[60] Continuation of Ser. No. 516,671, Jul. 26, 1983, abandoned, which is a continuation of Ser. No. 425,593, Sep. 23, 1983, abandoned, which is a division of Ser. No. 115,815, Jan. 28, 1980, Pat. No. 4,393,007, which is a continuation of Ser. No. 946,281, Sep. 25, 1978, abandoned, which is a continuation of Ser. No. 812,284, Jul. 1, 1977, abandoned.

[30] Foreign Application Priority Data

Jul. 7, 1976 [CH] Switzerland ............ 8701/76
Jul. 7, 1976 [CH] Switzerland ............ 8702/76

[51] Int. Cl.$^4$ .................................. C07C 97/24
[52] U.S. Cl. .................... 260/378; 260/366; 260/381
[58] Field of Search ................ 260/378, 381, 366

[56] References Cited

U.S. PATENT DOCUMENTS

| | | | |
|---|---|---|---|
| 2,112,258 | 3/1938 | Wilder | 260/378 |
| 2,128,178 | 8/1938 | Dettwyler | 260/381 |
| 2,487,045 | 11/1949 | Dickey | 260/381 |
| 3,123,605 | 3/1964 | Turetzky et al. | 260/378 |
| 3,821,262 | 6/1974 | Schoehauber et al. | 260/381 |
| 3,823,169 | 7/1974 | Staub | 260/378 |
| 4,246,172 | 1/1981 | Boehmke et al. | 260/381 |
| 4,296,044 | 10/1981 | Duchardt et al. | 260/381 |
| 4,393,007 | 7/1983 | Priester et al. | 260/378 |

FOREIGN PATENT DOCUMENTS

| | | | |
|---|---|---|---|
| 833605 | of 0000 | Belgium | |
| 112592 | of 0000 | Japan | |
| 1239778 | of 0000 | United Kingdom | |
| 22128 | of 1902 | United Kingdom | 260/378 |
| 452421 | 8/1936 | United Kingdom | 260/378 |
| 1102789 | 2/1968 | United Kingdom | 260/378 |

OTHER PUBLICATIONS

Barnett, *Anthracene and Anthraquinone*, 1949, 194–197, 200, 172.

Primary Examiner—Richard L. Raymond
Assistant Examiner—R. Covington
Attorney, Agent, or Firm—Edward McC. Roberts; Kevin T. Mansfield; Irving M. Fishman

[57] ABSTRACT

A process for the manufacture of quaternized diaminoanthraquinones by reacting alpha-nitro-anthraquinone with an amine of the formula

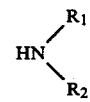

to give 1-aminoanthraquinone (B), halogenating, preferably brominating the compound (B) to give 1-amino-4-halogeno- or 1-amino-2,4-dihalogeno-anthraquinone (C), condensing the compound (C) with a diamine of the formula

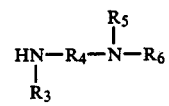

or with an amine of the formula $HNR_3R_7$ to give 1,4-diaminoanthraquinone (D) and subsequently quaternizing compound (D) to give the corresponding quaternized anthraquinone compound (E) which process comprises carrying out the condensation of compound (C) with the amine to form compound (D) and subsequent quaternization steps in one single operation without isolation of the intermediate (D).

10 Claims, No Drawings

PROCESS FOR THE MANUFACTURE OF ANTHRAQUINONE COMPOUNDS

This application is a continuation of application Ser. No. 516,671, filed July 26, 1983, now abandoned; which is a continuation of Ser. No. 425,593, filed Sept. 23, 1983, now abandoned; which is a division of Ser No. 115,815, filed Jan. 28, 1980, now U.S. Pat. No. 4,393,007, issued July 12, 1983; which is a continuation of Ser. No. 946,281, filed Sept. 25, 1978, now abandoned; which is a continuation of Ser. No. 812,284, filed July 1, 1977, now abandoned.

From Japanese patent specification No. 112,592 and Belgian patent specification No. 833,605 it is known to react α-nitroanthraquinones by reaction with amines in inert organic solvents to give α-amino-anthraquinones.

The reaction of α-amino-anthraquinones with elementary bromine in solvent mixtures to give 1-amino-4-bromoathraquinones is known from British patent specification No. 1,239,778.

By means of processes which are commonly known in the art it is possible to replace a halogen atom, in particular a bromine atom, in the anthraquinone nucleus by an amino group. The amination generally takes place in an organic solvent in the presence of an acid acceptor and a metal catalyst.

The diaminoanthraquinones obtained by the above reactions can finally be quaternised using different known quaternising agents.

The following reaction scheme will serve to demonstrate the course of the individual reaction steps, wherein R, $R_1$ represent alkyl groups $R_2$ an alkylene group and An represents an anion.

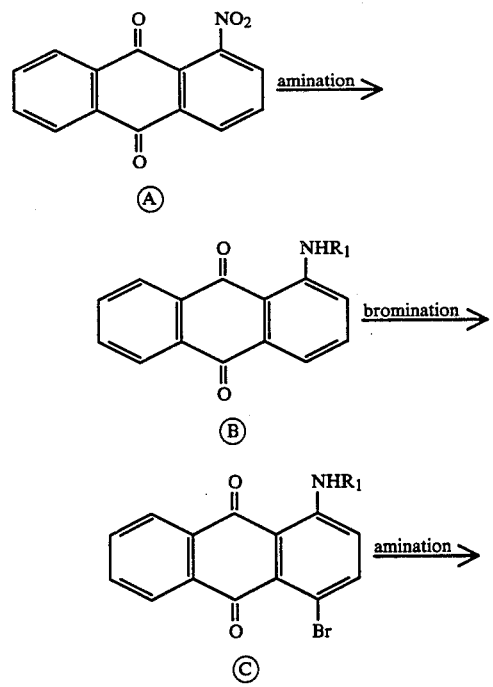

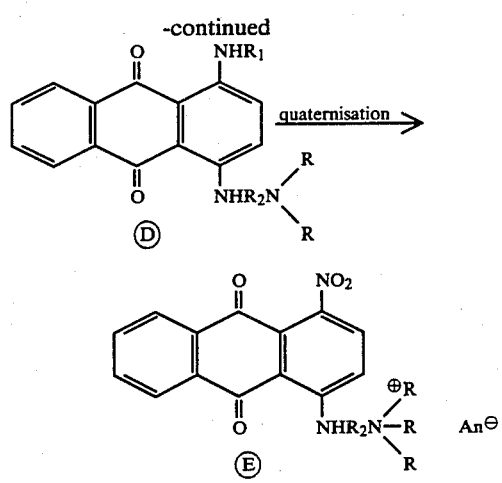

It has now been found that these reactions can be carried out in one single operation from C to E, B to E, A to E, and in particular from A to D, without isolation of the intermediates, which means a significant saving in apparatus and time.

Accordingly, the invention provides a process for the manufacture of anthraquinone compounds of the formula I

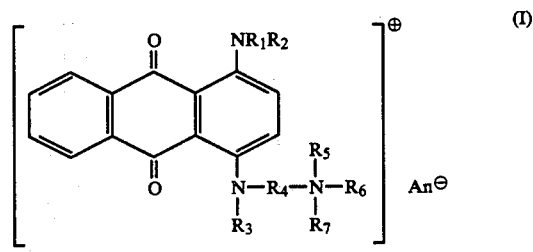

wherein each of
- $R_1$ and $R_2$ independently represents hydrogen, alkyl or cycloalkyl,
- $R_3$ represents hydrogen or alkyl,
- $R_4$ represents alkylene or cycloalkylene,
- $R_5$ and $R_6$ represent alkyl, aryl or alkylaryl,
- $R_7$ represents alkyl, aralkyl, aryl or cycloalkyl, and
- An represents an anion, by reacting an α-nitro-anthraquinone of the formula II

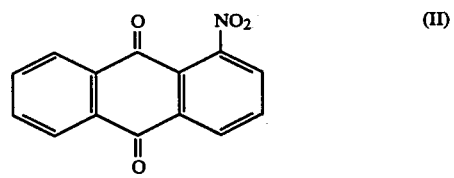

with an amine of the formula

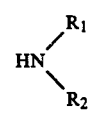

to give 1-aminoanthraquinone (E), halogenating, preferably brominating, the compound (B) to give 1-amino-4-halogeno- or 1-amino-2,4-dihalogeno-anthraquinone (C), condensing, the compound (C) with a diamine of the formula

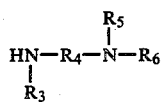

or with an amine of the formula HN—$R_3R_7$, to give 1,4-diaminoanthraquinone (D) and subsequently optionally quaternizing the compound (D) to give an anthraquinone compound of the formula I, which process comprises carrying out the reaction from A to E or A to D in one single operation without isolation of the intermediates.

By the term "halogen" is meant in this context fluorine, chlorine, and preferably, bromine. The term "alkyl" comprises in particular low molecular radicals, i.e. alkyl radicals of 1 to 4 carbon atoms. Cycloalkyl denotes in particular cyclohexyl.

The bridge member

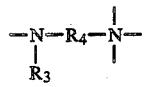

is derived from an aliphatic diamine.

Accordingly, $R_4$ can be a straight chain or branched alkylene radical, in particular an alkylene radical of 1 to 6 carbon atoms, for example ethylene, propylene, butylene, hexylene or cyclohexylene. Preferably $R_4$ is the ethylene or propylene radical.

The following compounds may be mentioned in particular as amines of the formula

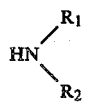

methylamine, dimethylamine, ethylamine, isopropylamine, isobutylamine, cyclohexylamine. Preferred amines are methylamine, ethylamine, isopropylamine or cyclohexylamine.

The amine HN—$R_3 R_7$ is derived from an aliphatic or aromatic amine. Accordingly, $R_7$ can be for example an unsubstituted or substituted naphthalene, benzyl or phenyl radical.

Particular mention may be made of the following compounds as amines of the formula HN—$R_3 R_7$: methylamine, dimethylamine, ethylamine, diethylamine, propylamine, isopropylamine butylamine, isobutylamine, isoamylamine, methylethylamine, aniline, methylaniline, methoxyaniline, hydroxyaniline, diphenylamine, benzylamine, methylbenzylamine, phenylethylamine or cyclohexylamine.

Preferred amines of the formula HN—$R_3R_7$ are: methylamine, dimethylamine, diethylamine, propylamine, isopropylamine, benzylamine, benzylmethylamine, cyclohexylamine, aniline, methylaniline and methoxyaniline.

The following compounds may be mentioned in particular as diamines of the formula

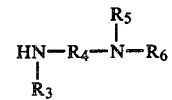

dimethylaminopropylenamine, benzylmethylaminopropylenamine, dimethylaminoethylenamine, diethylaminoethylenamine, benzylmethylaminoethylenamine, phenylmethylaminopropylenamine, phenylethylaminopropylenamine, phenylpropylaminopropylenamine, phenylmethylaminoethylenamine, phenylethylaminoethylenamine and phenylpropylaminoethylenamine.

Preferred diamines are dimethylaminopropylenamine, dimethylaminoethylenamine, benzylmethylaminoethylenamine and benzylmethylaminopropylenamine.

The preferred halogenating agent in reaction step C is in particular bromine.

Examples of alkylating (quaternising) agents are: esters of strong mineral acids, in particular low molecular weight sulphuric acid esters, or organic sulphonic acids, or alkyl halides, for example methyl chloride, methyl bromide or methyl iodide, aralkyl halides, for example benzyl chloride, esters of low molecular weight alkanesulphonic acids (i.e. containing 1 to 4 carbon atoms), for example methyl esters of methane-, ethane- or butanesulphonic acid, and esters of benzenesulphonic acids, such as the methyl, ethyl, propyl or butyl ester of benzenesulphonic acid, of 2- or 4-methylbenzenesulphonic acid, 4-chlorobenzenesulphonic acid or 3- or 4-nitrobenzenesulphonic acid, in particular, however, diethyl sulphate and dimethyl sulphate.

Depending on the quaternising agent used, the anthraquinone compound of the formula I is in the form of the corresponding salt.

Aprotic and protic solvents or mixtures thereof are used as reaction medium for the reaction of the present invention.

Preferred aprotic solvents are chlorinated hydrocarbons, toluene, xylenes, chlorobenzene, dichlorobenzenes, trichlorobenzene, nitrobenzene, sulpholane, ethylene glycol methyl or ethyl ether and pyridine.

Preferred protic solvents are the lower aliphatic alcohols.

The reaction temperature of the reaction which is carried out in a single operation is between 20° and 150° C. The process is carried out without applying pressure. Simple apparatus which is conventionally employed for such reactions, but which must be corrosion-proof, should suffice for carrying out the process.

In detail, the single operation process of the invention can be carried out as follows:

An amine is introduced at 80° to 150° C., preferably at 90° to 120° C., into a suspension of α-nitro-anthraquinone in a preferably aprotic solvent, for example dichlorobenzene, and the reaction mixture is stirred for 5 to 8 hours at this temperature. The reaction mixture is then diluted with a protic solvent, for example methanol, and, while stirring the 2 to 4 hours at −20° to +70° C., preferably at 20° to 40° C., bromine, which can be dissolved in a protic solvent, is introduced. After neutralization of the hydrogen bromide which is present in the batch and has formed during the halogenation, for example with a buffer or an inorganic or organic base, the diamine to be exchanged for halogen is introduced over the course of 3 to 6 hours at 60° to 100° C., using as catalyst one of the known heavy metal salts, preferably a copper salt or metallic copper.

When the reaction is complete, the protic solvent can be removed by distillation and the product which is dissolved in the aprotic solvent can be quaternized by known methods. Temperatures between 20° and 120° C., preferably between 30° and 100° C., are reaction times of a few minutes to 24 hours, preferably 3 to 8 hours, are suitable for this quaternization reaction. The reaction time is always dependent on the quaternizing reagents and the chosen reaction temperatures. The product is subsequently collected by suction filtration, washed and dried.

The molar ratios of the required reagents to the respective reaction substrate is normally between 1:1 to 1.2:1.

No problems of a technical nature or which affect the products occur in the novel process of the invention, regardless of whether the starting materials are anthraquinone compounds of the formula A or the intermediates B and C.

As examples of products which can be obtained by the novel process there may be mentioned: 1-methylamino-4-(3-trimethylammonio-propylamino)-anthraquinone methosulphate, 1-methylamine-4-(3-benzyl-3-dimethylammonio-propylamino)-anthraquinone chloride, 1-methylamino-4-(2-trimethylammonioethylamino)-anthraquinone methosulphate, 1-methylamino-4-(3-trimethylammonio-propylamino)-anthraquinone methosulphate, 1-methylamino-4-(3-trimethylammonio-propylamino)-anthraquinone methosulphate, 1-isopropylamino-4-(3-trimethylammonio-propylamino)-anthraquinone methosulphate, 1-isopropylamino-4-(3-benzyl-3-dimethylammonio-propylamino)-anthraquinone chloride, 1-isopropylamino-4-(2-trimethylammonio-ethylamino)-anthraquinone methosulphate, 1-isopropylamino-4-(2-benzyl-2-dimethylammonioethylamino)-anthraquinone chloride and 1-cyclohexylamino-4-(3-trimethylammonio-propylamino)-anthraquinone methosulphate. Depending on the quaternizing reagents used, the anion can also be for example in the form of the bromide, tetrafluoroborate $BF_4^{\ominus}$) or trichlorozineate ($ZnCl_3^{\ominus}$).

Compared with the known processes for the manufacture of compounds of the formula I, which proceed in a number of separate operations, the process of the present invention has significant ecological advantages. In particular, however, it results in savings of energy, assistants and equipment, since the labour-intensive precipitation, filtration, washing and drying of the intermediates are emitted.

The compounds of the formula I are useful cationic dyes. It is surprising that the cationic dyes obtained by the novel single operation process are at least identical, if not indeed superior, in quality from the colouristic point of view to the dyes which are prepared by the multi-step processes.

A very special advantage of the novel process resides in the substantial improvement in the yield of the products obtained. Thus, for example, the increase in yield in the manufacture of a product from A to E by the novel process is at least 14% compared with the sum of the individual steps of the multi-step process.

The invention is illustrated by the following Examples, in which the parts and percentages are by weight.

EXAMPLE 1

With stirring, 215 parts of o-dichlorobenzene and 64 parts of 1-nitroanthraquinone are heated to 120° C. At constant temperature, 50 parts of methylamine are blown uniformly into the suspension over the course of 6 hours. Then 40 parts of solvent are distilled off from the dark red solution in vacuo. The bath is diluted with 400 parts of methanol with intensive stirring and a solution of 49.4 parts of bromine and 35 parts of methanol is added dropwise at 30° to 35° C. The reaction mixture is stirred for 2 hours at the same temperature and then 24.3 parts of sodium hydroxide are added by small amounts. To the red suspension are added 26.6 parts of dimethylaminopropylenamine and 1 part of copper acetate and the batch is refluxed for 6 hours. The methanol is distilled off and the residual concentrated solution is washed three times with water and then diluted with 975 parts of o-dichlorobenzene. The solution is then distilled free of water and cooled.

After cooling, 31.5 parts of dimethyl sulphate are added dropwise and the reaction mixture is stirred for 2 hours. After suction filtration, the filter cake is washed with o-dichlorobenzene and dried, affording 100 parts of crude dye, corresponding to a yield of 86.5% of theory.

EXAMPLE 2

79 Parts of 1-bromo-4-methylamino-anthraquinone, 280 parts of methanol, 72 parts of chlorobenzene, 10 parts of sodium hydroxide, 1 part of copper acetate and 26.7 parts of dimethylaminopropylenamine are mixed and heated, with reflux cooling, until no more starting material can be detected. The methanol is distilled off from the blue reaction solution and the residual concentrated chlorobenzene solution is diluted with 220 parts of chlorobenzene and washed three times with water, then diluted with 900 parts of chlorobenzene. The solution is distilled free of water and cooled. Then 31.5 parts of dimethyl sulphate are added dropwise at 35° C. and the reaction mixture is stirred for 1 hour. After suction filtration, the filter cake is washed with 600 parts of chlorobenzene and dried, affording 102 g of crude dye, corresponding to a yield of 88% of theory.

EXAMPLE 3

A solution of 49.6 parts of bromine in 40 parts of methanol is added dropwise, with stirring, at 35° C. to a suspension consisting of 72 parts of chlorobenzene, 280 parts of methanol and 59.3 parts of 1-methylamino-anthraquinone. The reaction mixture is stirred at constant temperature until bromination is complete. Thereafter 24.8 parts of sodium hydroxide, 26.7 parts of dimethylaminopropylenamine and 1 part of copper carbonate are added and the mixture is boiled for several hours with reflux cooling. The methanol is distilled off from the blue solution, the residual concentrated chlorobenzene solution is diluted with 220 parts of chlorobenzene and washed three times with water, then diluted with 900 parts of chlorobenzene. The solution is then distilled free of water and cooled. Then 31.5 parts of dimethyl sulphate are added dropwise at 35° C. and the reaction mixture is stirred for 1 hour. After suction filtration, the filter cake is washed with 600 parts of chlorobenzene and dried, affording 102 parts of crude dye, corresponding to a yield of 88% of theory.

EXAMPLE 4

33.1 Parts of isopropylamino-anthraquinone in 125 parts of methanol are treated at room temperature with a solution of 22 parts of bromine in 25 parts of methanol. The mixture is subsequently stirred for 1 hour at 65° C. With external cooling, 11 parts of sodium hydroxide are added at a max. temperature of 30° C., followed by the addition of 13.4 parts of dimethylaminopropylenamine and 0.5 part of copper acetate. Then 150 parts of chlorobenzene are added to the mixture and thereafter 150 parts of methanol are distilled off. After cooling, 400 parts of water are added and the batch is stirred for half an hour at room temperature. After separation of the layers, the water phase is separated. To the organic phase are again added 400 parts of water as well as 2 parts of tetrasodium ethylenediaminetetracetate. Both phases are well stirred again for half an hour and then separated. The organic phase is washed a third time with 400 parts of water and, after washing with 400 parts of chlorobenzene, distilled free of water. The volume of the solution is adjusted to 250 ml with anhydrous chlorobenzene. The mixture is treated at 100° C. with 17.4 parts of benzyl chloride and stirred for 6 hours. After cooling to approx. 40° C., the reaction mixture is filtered. After washing with warm chlorobenzene, the residue is dried in vacuo, affording 54 parts of a dye of the formula

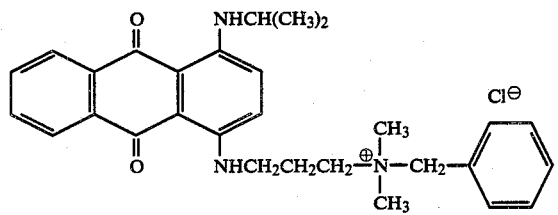

which dyes polyacrylonitrile in clear blue shades of good fastness properties.

If quaternization is carried out at 70° C. instead of at 100° C., the reaction lasts 10 hours. The yield and quality of the product remain unchanged. Quaternization with 15.5 parts of dimethyl sulphate instead of with benzyl chloride at 35° C. for 1½ hours yields in analogous manner 55 parts of the dye of the formula

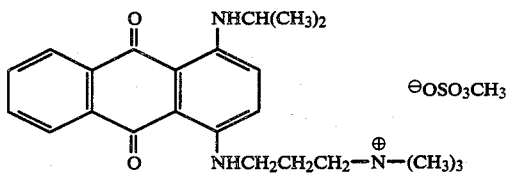

which gives a clear blue dying of good fastness properties on polyacrylonitrile.

The dye of the formula

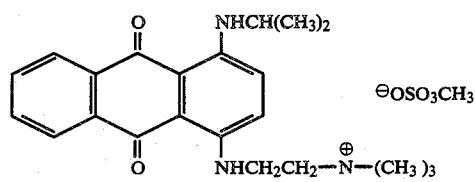

which dyes polyacrylonitrile is clear blue shades of good fastness properties is obtained in the same manner by varying the respective reagents.

By repeating the procedure of Example 1 using instead of the reagents mentioned therein those which correspond to the substituents of the following table, there are obtained products of the formula 1 with the substituents listed in Table 1 and which dye polyacrylonitrile by conventional dyeing methods in blue shades.

TABLE 1

$$\left[\begin{array}{c}\text{anthraquinone with } NR_1R_2 \text{ and } N(R_3)-R_4-N(R_5)(R_6)-R_7\end{array}\right]^{\oplus} X^{\ominus}$$

$$R_4-\overset{R_5}{\underset{R_7}{N}}-R_6 \quad X^{\ominus}$$

| $R_1$ | $R_2$ | $R_3$ | $R_4-N(R_5)(R_6)-R_7$ |
|---|---|---|---|
| H | —CH$_3$ | H | —CH$_2$CH$_2$—$\overset{\oplus}{N}$—(CH$_3$)$_3$.X$^{\ominus}$ |
| H | —CH$_3$ | H | —CH$_2$CH$_2$CH$_2$—$\overset{\oplus}{N}$—(CH$_3$)$_2$—CH$_2$—C$_6$H$_5$.X$^{\ominus}$ |
| H | —CH(CH$_3$)$_2$ | H | —CH$_2$CH$_2$CH$_2$—$\overset{\oplus}{N}$(CH$_3$)(CH$_3$)—CH$_2$—C$_6$H$_4$—X$^{\ominus}$ |
| H | —CH(CH$_3$)$_2$ | H | —CH$_2$CH$_2$—$\overset{\oplus}{N}$(CH$_3$)(CH$_3$)—CH$_2$—C$_6$H$_4$—X$^{\ominus}$ |
| H | — | H | —CH$_2$CH$_2$CH$_2$—$\overset{\oplus}{N}$—(CH$_3$)$_3$.X$^{\ominus}$ |

$X^{\ominus}$ can be $Cl^{\ominus}.Br^{\ominus}.BP_4^{\ominus}.CH_3OSO_3^{\ominus}.ZnCl_3^{\ominus}$

EXAMPLE 5

With stirring, 215 parts of o-dichlorobenzene and 64 parts of 1-nitro-anthraquinone are heated to 120° C. At constant temperature, 50 parts of methylamine are introduced uniformly into the suspension over the course of 6 hours. 40 parts of solvent are distilled off in vacuo from the dark red solution, which is then diluted with 400 parts of methanol while stirring vigorously. A solution of 49.4 parts of bromine and 35 parts of methanol is added dropwise at 30° C. to 5° C., stirring is continued for 2 hours at the same temperature and then 24.8 parts of sodium hydroxide are added in portions.

To the red suspension are added 17.7 parts of propylamine and 1 part of copper acetate and the batch is refluxed for 6 hours. The methanol is then distilled off, the residual concentrated solution washed three times with water, then diluted with 975 parts of o-dichlorobenzene, and the solution is distilled free of water and cooled.

After suction filtration, washing with o-dichlorobenzene and drying, 103 parts of crude dye are obtained, corresponding to a yield of 89% of theory.

EXAMPLE 6

A solution of 49.6 parts of bromine in 40 parts of methanol is added dropwise with stirring at 35° C. to a suspension consisting of 72 parts of chlorobenzene, 280 parts of methanol and 59.3 parts of 1-methylamino-anthraquinone. The reaction mixture is stirred at constant temperature until comlete bromination has taken place. Then 24.8 parts of sodium hydroxide, 13.4 parts of dimethylamine and 1 part of copper carbonate are added and the mixture is boiled for several hours with reflux cooling. The methanol is distilled off from the blue reaction solution and the residual concentrated chlorobenzene solution is diluted with 220 parts of chlorobenzene and washed three times with water, then diluted with 900 parts of chlorobenzene. The solution is distilled free of water and cooled. After suction filtration, washing with 600 parts of chlorobenzene and drying, 105 parts of crude dye are obtained, corresponding to a yield of 91% of theory.

EXAMPLE 7

33.1 Parts of isopropylamino-anthraquinone in 125 parts of methanol are treated at room temperature with a solution of 22 parts of bromine in 25 parts of methanol. The mixture is thereafter stirred for 1 hour at 65° C. With external cooling, 11 parts of sodium hydroxide are added at a max. temperature of 30° C., followed by the addition of 14.4 L parts of benzylamine and 0.5 part of copper acetate. The reaction is complete after stirring for 1½ hours at 68° C. 150 Parts of chlorobenzene are added to the mixture and subsequently 150 parts of methanol are distilled off.

The concentrated chlorobenzene solution is cooled to approx. 40° C. and filtered. After washing with warm chlorobenzene, the residue is dried in vacuo, giving 60 parts of a dye of the formula

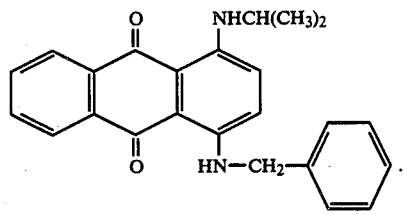

By repeating the procedure of Example 1 and using instead of the reagents mentioned therein those which correspond to the substituents of the following table, there are obtained products of the formula I with the substituents listed in Table 2 and which dye polyester by conventional dyeing methods in blue shades.

TABLE 2

| Hr. | $R_1$ | $R_2$ | $R_5$ | $R_7$ |
|---|---|---|---|---|
| 1 | H | —$CH_3$ | H | —$CH_3$ |
| 2 | H | —$CH_3$ | —$CH_3$ | —$CH_2CH_2CH_3$ |
| 3 | H | —$CH(CH_3)_2$ | H | cyclohexyl-H |
| 4 | H | —$CH_3$ | H | phenyl-$CH_3$ |
| 5 | H | —$CH_3$ | H | phenyl-$NHCH_2CH_2OH$ |
| 6 | H | —$CH_3$ | H | phenyl-OH |
| 7 | H | —$CH_3$ | H | phenyl-$OCH_3$ |

TABLE 2-continued

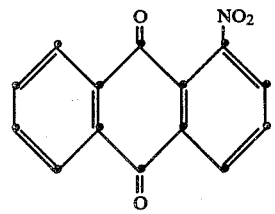

| Hr. | R₁ | R₂ | R₅ | R₇ |
|---|---|---|---|---|
| 8 | H | —CH₂CH₃ | H | (phenyl) |
| 9 | —C₂H₅ | —CH₃ | —CH₃ | —CH₂CH₂CH(CH₃)₂ |
| 10 | H | —CH(CH₃)₂ | H | (4-methylphenyl) |
| 11 | H | —CH(CH₃)₂ | H | —CH₂CH₂CH₂CH₃ |
| 12 | H | —CH(CH₃)₂ | —C₂H₅ | —CH₂CH₃ |
| 13 | H | (cyclohexyl) | —CH₃ | —CH₃ |
| 14 | H | —CH(CH₃)₂ | H | —CH₂—(phenyl) |

What we claim is:

1. A process for the manufacture of a quaternized anthraquinone of the formula

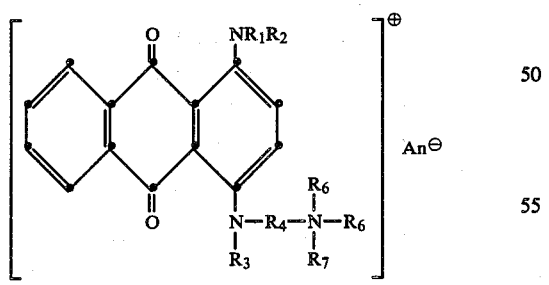

wherein each of $R_1$ and $R_2$ independently represents hydrogen, alkyl or cycloalkyl, $R_3$ represents hydrogen or alkyl, $R_4$ represents alkylene or cycloalkylene, $R_5$ and $R_6$ represents alkyl, aryl or aralkyl, $R_7$ represents alkyl, aralkyl, aryl or cycloalkyl, and An represents an anion, which process comprises the steps of (1) reacting in an aprotic solvent at a temperature of 80° to 150° C., an alpha-nitro-anthraquinone (A) of the formula

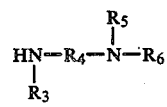

with an amine of the formula $$HN\begin{matrix}R_1\\R_2\end{matrix}$$

to give 1-aminoanthraquinone (B), wherein $R_1$ and $R_2$ have the meaning given above, (2) halogenating said compound (B) by diluting the reaction mixture with a protic solvent and introducing a bromine/methanol mixture at −20° to +70° C. to give 1-amino-4-bromo-anthraquinone (C), (3) condensing said compound (C) after neutralization with a diamine of the formula $$HN-R_4-N\begin{matrix}R_5\\R_6\end{matrix}$$
$$\quad|\qquad\quad\,\,\,$$
$$R_3\qquad\qquad$$

at 60° to 100° C. in the presence of a heavy metal salt to give 1,4-diamino anthraquinone (D), where $R_3$, $R_4$, $R_5$, $R_6$ and $R_7$ have the meaning given above, and (4) subsequently quaternizing said compound (D) to give the corresponding quaternized anthraquinone, and carrying out the reaction step (3), in a mixture of the aprotic and protic solvents of steps (1) and (2), in one single operation without isolation of the intermediate (D), wherein the aprotic solvent of step (1) is a chlorinated hydrocarbon, toluene, a xylene, chlorobenzene, or a dichlorobenzene, and the protic solvent of step (2) is a lower aliphatic alcohol.

2. A process according to claim 1 wherein the amine of the formula

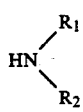

is methylamine, dimethylamine, ethylamine, isopropylamine, isobutylamine or cyclohexylamine.

3. A process according to claim 1 wherein the diamine of the formula

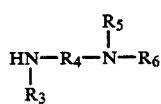

is dimethylaminopropylenamine, benzylmethylaminopropylenamine, dimethylaminoethylenamine, diethylaminoethylenamine, benzylmethylaminoethylenamine, phenylmethylaminopropylenamine, phenylethylaminopropylenamine, phenylpropylaminopropylenamine, phenylmethylaminoethylenamine, phenylethylaminoethylenamine and phenylpropylaminoethylenamine.

4. A process according to claim 1 wherein the amine of the formula

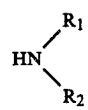

is methylamine, ethylamine, isopropylamine or cyclohexylamine and the diamine of the formula

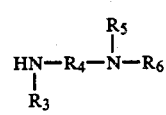

is dimethylaminopropylenamine, dimethylaminoethylenamine, benzylmethylaminoethylenamine or benzylmethylaminopropylenamine.

5. A process according to claim 1 wherein the amine of the formula

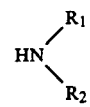

is methylamine and the diamine of the formula

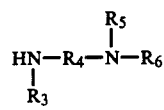

is dimethylaminopropylenamine.

6. A process according to claim 1 wherein the quaternizing agent is benzylchloride or dimethyl or diethyl sulphate.

7. A process according to claim 1 which comprises reacting an 1-amino-4-bromo-anthraquinone (C) of the formula

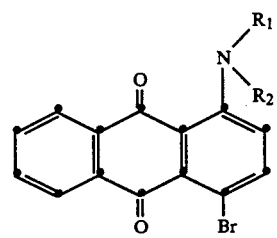

wherein each of $R_1$ and $R_2$ independently represents hydrogen, alkyl or cycloalkyl with a diamine of the formula

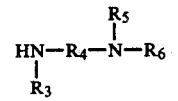

at 60° to 100° C. in the presence of a heavy metal salt to give 1,4-diaminoanthraquinone (D), and subsequently quaternizing said compound (D) to give the corresponding quaternized anthraquinone, wherein both reaction steps are carried out in one single operation without isolation of the intermediate (D).

8. The process of claim 1, wherein the protic solvent of step (2) is methanol.

9. A process according to any one of claims 2, 3, 4, 5, 6, 7, 8, and 1 wherein the single operation reaction is carried out in a temperature range between 20° and 150° C.

10. A process according to claim 1 wherein the amine of the formula

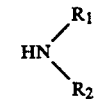

is isopropylamine and the diamine of the formula

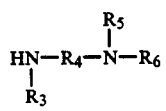

is dimethylaminopropylenamine.

* * * * *

UNITED STATES PATENT AND TRADEMARK OFFICE
CERTIFICATE OF CORRECTION

PATENT NO. : 4,655,970

DATED : APRIL 7, 1987

INVENTOR(S) : MARTIN PRIESTER, PETER LOEW

It is certified that error appears in the above-identified patent and that said Letters Patent is hereby corrected as shown below:

On the cover page, Item [60], lines 2-3 should read -- Ser. No. 425,593, Sep. 28, 1982 abandoned --.

Signed and Sealed this

Fifth Day of April, 1988

*Attest:*

DONALD J. QUIGG

*Attesting Officer*        *Commissioner of Patents and Trademarks*